W. H. CLIFFORD.
WIND SHIELD CLEANER.
APPLICATION FILED FEB. 2, 1917.
1,266,919.
Patented May 21, 1918.
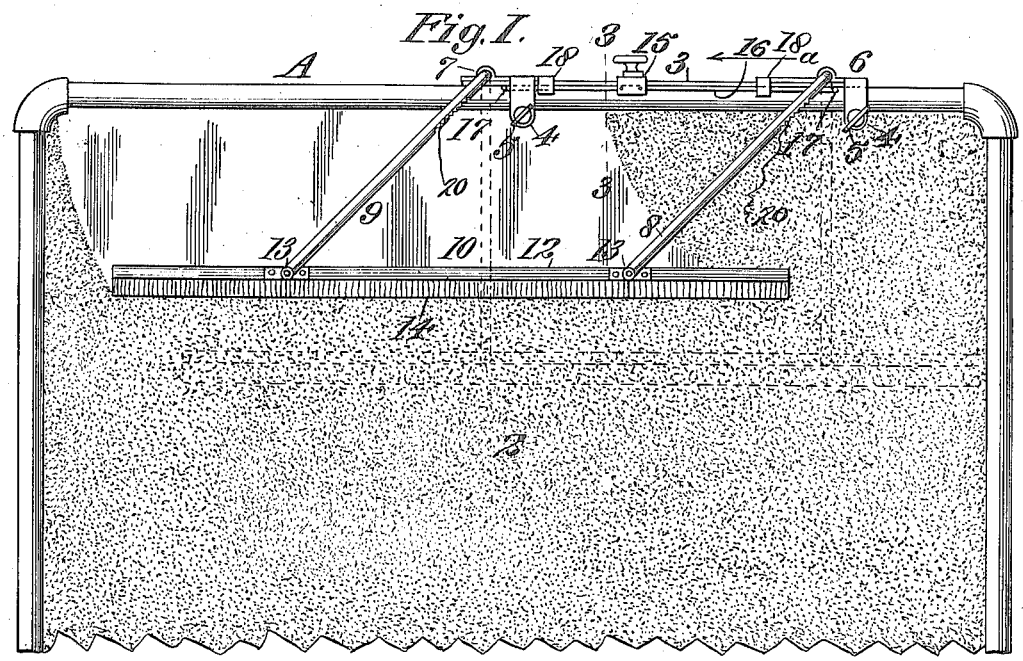
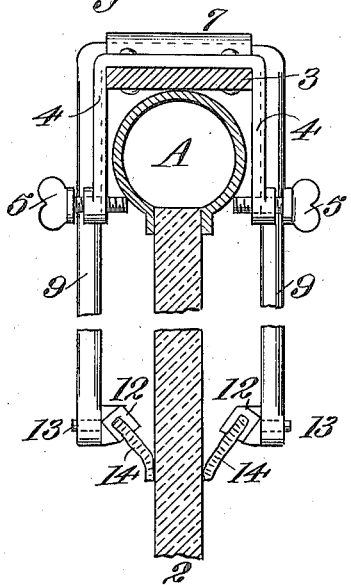
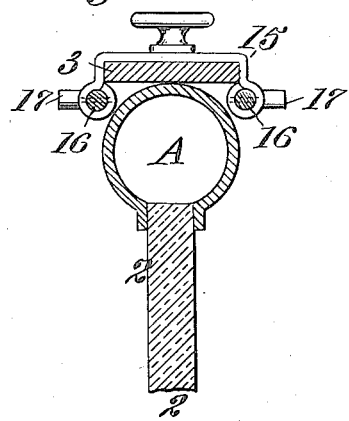
WITNESSES:
Charles Rekles
Julius C. Benesch
INVENTOR
William H. Clifford
BY Strong & Townsend
ATTORNEYS

UNITED STATES PATENT OFFICE.

WILLIAM H. CLIFFORD, OF SAN FRANCISCO, CALIFORNIA.

WIND-SHIELD CLEANER.

1,266,919.  Specification of Letters Patent.  Patented May 21, 1918.

Application filed February 2, 1917. Serial No. 146,064.

*To all whom it may concern:*

Be it known that I, WILLIAM H. CLIFFORD, a citizen of the United States, residing at the city and county of San Francisco and State of California, have invented new and useful Improvements in Wind-Shield Cleaners, of which the following is a specification.

This invention relates to a wind-shield wiper.

The present invention, while capable of more or less general application, has been especially designed for use in connection with wind-shields of automobiles. One of the objects of the invention is to provide a simple wiper or cleaner, consisting of few parts which may be easily and quickly secured to a wind-shield of ordinary construction without the use of special tools or the assistance of expert mechanics, and which device, when applied and not used, will occupy a small space where obstruction as regards vision is entirely avoided. Another object of the invention is to provide a wiper which engages both sides of the shield, thus making it possible to quickly remove rain, fog, snow or sleet which would otherwise collect in sufficient quantities to obstruct the vision through the shield. Further objects will hereinafter appear.

The invention consists of the parts and the construction and combination of parts, as hereinafter more fully described and claimed, having reference to the accompanying drawings, in which—

Figure 1 is a front view of a wind-shield, showing the application of the invention.

Fig. 2 is a vertical cross section, taken on the line 3—3 of Fig. 1 and looking to the left, the lock rods being omitted.

Fig. 3 is a vertical cross section of the bracket plate, taken on the line 3—3 of Fig. 1.

Referring to the drawings in detail, A indicates the frame of an ordinary automobile wind-shield and 2 the glass secured in same. Mounted on top of the frame A is a bracket plate 3, which is secured to the frame by a pair of downwardly turned lugs 4, near each end, and in which are mounted clamp screws 5. Pivotally mounted, as at 6 and 7, on the bracket plate 3 is a pair of U-shaped arms 8 and 9 which are adapted to straddle the frame and the glass secured therein, as shown in Fig. 2.

Pivotally mounted between each pair of arms 8 and 9, both inside and outside of the glass, is a pair of rubber wipers 10 and 11, there being one on each side of the glass. Each wiper consists of a holder 12 which is pivotally secured to the arms 8 and 9, as at 13, and each holder is provided with a rubber wiper 14 which is preferably disposed at an angle with relation to the glass surface, as shown in Fig. 2.

Slidably mounted on the bracket plate 3 is a shoe 15 and secured under the plate and connected with the shoe is a pair of rods 16, the ends of which are outwardly turned, as at 17, to permit them to engage the arms 8 and 9, when they are swung to a horizontal position. The rods 16 while secured to the shoe 15 may also be supported with relation to the bracket plate by means of bearing lugs 18.

In actual operation, with the shoe 15 and the rod 16 assuming the position shown in Fig. 1, it is only necessary to grasp either arm 8 or 9 and swing it in a downward direction across the surface of the glass. This causes both wipers to clean or remove rain, fog, sleet, or the like from that portion of the wind-shield which should be clear to permit a free vision in a forward direction while driving. The arms 8 and 9 may be released and permitted to hang in a vertical position, if desired, particularly if it is necessary to wipe the glass often. They may, however, be supported in a horizontal position where they are entirely out of the way, as they assume a parallel position with relation to the upper portion of the wind-shield frame A. They are supported in this position by merely sliding the shoe 15 and the rods 16 in the direction of arrow *a*, as this movement causes the outwardly projecting ends 17 to engage the undersides of the arms 8 and 9 and support same. The undersides may be corrugated or roughened, as shown at 20, to form a positive lock between the rods 16 and the arms 8 and 9, if desired, thus preventing any vibrating movement from accidentally releasing the arms.

The wiper here shown is simple and substantial in construction and as it is secured in place by means of clamp screws, such as shown at 5, it can readily be seen that it may be attached to practically any standard wind-shield without expert assistants or tools of special design. So few parts are employed that there is little likelihood of anything getting out of order or adjustment; and as the only movable parts, comprising the arms 8 and 9, are spaced apart and supported at their lower ends, by means of rubber wipers, it can readily be understood that noise caused from rattling or vibration is entirely eliminated.

The materials and finish of the several parts of the device are such as the experience and judgment of the manufacturer may dictate.

I wish it understood that various changes in form, proportions and details of construction may be resorted to within the scope of the appended claims, and that I do not wish to limit myself to the specific design and construction here shown.

Having thus described my invention, what I claim and desire to secure by Letters Patent is—

1. In a wind shield cleaner, a pair of spaced pendent arms, means to pivotally connect said arms at their upper ends to the wind shield, a horizontal wiper holder pivotally connecting the lower ends of the arms and formed with an inclined, downwardly opening seat, and a wiper secured in said seat.

2. In a wind shield cleaner, a pair of spaced U-shaped members each arranged to straddle the top of the wind shield and pivotally connected thereto, a holder on each side connecting the respective pair of arms and formed with a downwardly opening groove inclined toward the other holder, and a wiper disposed in each holder groove and arranged in a downwardly convergent relation to the other wiper.

3. In a wind shield cleaner, vertically swinging cleaning devices operable on opposite sides of the wind-shield, a sliding lock element including spaced locking members arranged on opposite sides of the windshield and simultaneously engageable with said devices respectively, and means to mount said lock element on the top edge of the wind-shield.

4. In a wind-shield cleaner, a pair of cleaning members movable in unison and arranged on opposite sides of the windshield, means to mount said members whereby the same will be horizontally disposed, said means including pendent arms, a slide, means to mount said slide on the top of the wind-shield, and a pair of rods having outturned ends connected to the slide to move therewith to cause said outturned ends to engage beneath the arms to support the cleaning devices against downward movement.

5. A bar-like supporting plate, spaced U-shaped members pivotally supported at their bases thereon, connecting cleaning members between the arms, and a lock slidably mounted on the plate for engaging the U-members to hold them against swinging movement.

6. An elongated body adapted to be mounted on a wind shield frame, spaced U-shaped members straddling the body and pivotally connected thereto at their bases carrying a cleaner on each side of the shield, a slide member movable on the body, and a pair of locking rods carried by the slide member on opposite sides of the body and provided with outturned ends for engaging with the arms of the U-members to hold the same against movement.

7. An elongated body adapted to be mounted on a wind shield frame, spaced U-shaped members straddling the body and pivotally connected thereto at their bases, carrying a cleaner on each side of the shield, the arms of the U-members having serrated portions, a slide member movable on the body, and a pair of locking rods carried by the slide member on opposite sides of the body and provided with outturned ends for engaging with the serrated portions of the arms of the U-members to hold the same against movement.

8. In a windshield cleaner, a pair of spaced pendent arms, means to pivotally connect said arms at their upper ends to the windshield, a horizontal cleaning device, the lower end of each arm being connected to a respective end of the cleaning device to cause the latter to swing in parallelism to thereby enable both arms and cleaning device to lie parallel to and adjacent the top of the wind-shield.

In testimony whereof I have hereunto set my hand in the presence of two subscribing witnesses.

WILLIAM H. CLIFFORD.

Witnesses:
 PATRICK GALLAGHER,
 R. L. HUSTED.